United States Patent [19]

Iwata

[11] Patent Number: 5,207,200
[45] Date of Patent: May 4, 1993

[54] MISFIRING SENSING APPARATUS FOR AN INTERNAL COMBUSTION ENGINE

[75] Inventor: Toshio Iwata, Himeji, Japan

[73] Assignee: Mitsubishi Denki Kabushiki Kaisha, Tokyo, Japan

[21] Appl. No.: 913,814

[22] Filed: Jul. 16, 1992

[30] Foreign Application Priority Data

| Jul. 17, 1991 | [JP] | Japan | 3-176865 |
| Jul. 19, 1991 | [JP] | Japan | 3-179700 |
| Jul. 19, 1991 | [JP] | Japan | 3-179701 |
| Jul. 19, 1991 | [JP] | Japan | 3-179702 |
| Jul. 19, 1991 | [JP] | Japan | 3-179703 |
| Jul. 19, 1991 | [JP] | Japan | 3-179704 |

[51] Int. Cl.$^5$ .................................................. F02P 5/14
[52] U.S. Cl. .................................. 123/425; 73/35; 73/115
[58] Field of Search ............... 123/425, 435, 198 DB, 123/198 DC, 643; 73/35, 115, 116, 117.3

[56] References Cited

U.S. PATENT DOCUMENTS

| 4,232,545 | 11/1980 | Dobler et al. | 73/35 |
| 4,312,215 | 1/1982 | Dobler et al. | 73/35 |
| 4,359,893 | 11/1982 | Kizler et al. | 73/115 |
| 4,417,556 | 11/1983 | Latsch | 123/425 |
| 4,488,528 | 12/1984 | Morikawa | 123/425 |
| 4,648,367 | 3/1987 | Gillbrand et al. | 123/425 |
| 4,762,106 | 8/1988 | Blauhut | 123/425 |
| 4,979,481 | 12/1990 | Shimomura et al. | 123/198 DB |
| 4,987,771 | 1/1991 | Iwata | 73/117.3 |
| 5,067,462 | 11/1991 | Iwata et al. | 123/425 |
| 5,087,882 | 2/1992 | Iwata | 123/425 X |
| 5,144,927 | 9/1992 | Denz | 123/425 |
| 5,146,893 | 9/1992 | Ohsawa | 123/425 |

Primary Examiner—Willis R. Wolfe
Attorney, Agent, or Firm—Sughrue, Mion, Zinn, Macpeak and Seas

[57] ABSTRACT

A misfiring sensing apparatus for an internal combustion engine is disclosed, which comprises an ionic current sensing circuit 16 for sensing an ionic current generated upon combustion of fuel in the engine. An ECU 30 determines misfiring in the engine based on the presence or absence of an ionic current in each ignition cycle, and identifies a misfiring cylinder based on a cylinder identifying signal SC from a crank angle sensor 25. It further identifies a failure in the ionic current sensing circuit 16 when an ionic current has not been successively sensed for a predetermined number of ignitions corresponding to the number of the cylinders. Moreover, a plurality of ionic current sensing circuits 16 may be provided one for each cylinder so that at least one output of the ionic current sensing circuits can be used for cylinder identification. This simplifies the crank angle sensor which, in this case, needs not to generate the reference position signal.

11 Claims, 8 Drawing Sheets

MISFIRING SENSING APPARATUS FOR AN INTERNAL COMBUSTION ENGINE

BACKGROUND OF THE INVENTION

This invention relates to an apparatus for sensing misfiring in an internal combustion engine based on an ionic current generated between electrodes of a spark plug corresponding to each of a plurality of cylinders and, more particularly, it relates to sensing a failure in an ionic current sensing unit. More specifically, the invention concerns with a misfiring sensing apparatus for an internal combustion engine, in which individual constituent means are simplified in construction for cost reduction.

In internal combustion engines generally used for automotive vehicles or the like, a plurality of (e.g., four) cylinders, which are driven to operate in synchronism with the rotation of a crankshaft, are repeatedly controlled by an engine control unit (ECU) including a microcomputer to perform four cycles consisting of intake, compression, combustion and exhaust strokes. At this time, unless an air/fuel mixture in a cylinder compressed by a piston therein is combusted in an optimum fashion and without fail in the combustion cycle, abnormal loads are applied to the other cylinders. In such a case, it is liable to cause damage to the engine and give rise to various troubles or problems due to the leakage of uncombusted gases.

When misfiring in a cylinder is sensed, the fuel supply to this cylinder is stopped or other like measures are taken for preventing the exhaust gas processing catalyst in a catalytic converter from being damaged or degraded by uncombusted gases. Thus, in order to avoid adverse effects on the internal combustion engine and the catalyst, it is necessary to check whether combustion has been done for each cylinder without fail. Heretofore, there has been proposed an apparatus which senses ionic current generated in a gap between electrodes of a spark plug during combustion of an air/fuel mixture, and determines the occurrence of misfiring if the ionic current thus generated is below a predetermined level.

FIG. 8 is a circuit diagram showing a usual misfiring sensing apparatus for an internal combustion engine. The circuit shown in the Figure is only for one cylinder. Actually, identical circuits are provided independently for respective cylinders.

The apparatus illustrated includes a power supply 1 connected to an unillustrated battery, a spark plug 2 having a primary winding 2a with one end thereof connected to the power supply 1 and a secondary winding 2b, a power transistor 3 connected between the primary winding 2a and ground, and a reverse current checking diode 4 with a cathode thereof connected to the secondary winding 2b.

The spark plug 5 has a pair of opposed electrodes, one of which is connected to the secondary winding 2b via the diode 4, the other electrode being grounded. Though not illustrated, a spark plug is provided for each of a plurality of cylinders, with its electrodes disposed in a combustion chamber defined in each cylinder.

A power supply 6 is connected to an anode of the reverse current checking diode 4. The diode 4 is connected between the power supply 6 and a junction between a diode 7 and the spark plug 5. An output terminal 9 for sensing an ionic current is connected to a junction between the power supply 6 and a resistor 8.

The operation of the misfiring sensing apparatus as shown in FIG. 8 will now be described with reference to a waveform diagram illustrated in FIG. 9.

In the combustion or ignition cycle, when a primary current I1 in the primary winding 2a is cut off under the control of the power transistor 3 in response to a control signal C from an ECU (not shown), a secondary voltage V2, which is a high negative voltage, is induced. As a result, a discharge spark is produced between the electrodes of the spark plug 5 to thereby cause combustion of the fuel in the combustion chamber. The discharge at this time is usually continued for 1 to 1.5 msec.

When normal combustion is effected in the combustion cycle, a large quantity of cations are generated. These cations flow as an ionic current I from one of the electrode of the spark plug 5 through the diode 7 to the power supply 6 and thence through the resistor 8 to ground. Thus, by sensing a voltage drop across the resistor 8, the level of the ionic current I thus generated can be sensed to determine whether normal combustion has been effected.

The data about the sensed level of the ionic current I is output from the output terminal 9 to the unillustrated ECU, which determines, based thereon, whether normal combustion has been effected in the cylinder that has been fired by the spark plug 5. If misfiring is determined, the sparking or ignition timing can be properly controlled in a feedback manner, or other appropriate measures such as stopping the fuel supply to the misfiring cylinder, stopping the operation of the misfiring cylinder or the like can be taken.

In the prior art misfiring sensing apparatus described above, however, upon occurrence of breaks or short-circuiting in wiring connecting between each cylinder and an ionic current sensing means inclusive of the elements 6 through 9 as well as in a transmission line connecting between the output terminal 9 and the ECU, or upon a failure in a circuit element in the ionic current sensing means, it becomes difficult to sense the ionic current I. In this case, the ECU erroneously determines misfiring in the engine.

Further, in a special operating range of the engine such as an engine start-up operation, idling or quick acceleration, a cylinder is sometimes supplied with no fuel even in the normal operating condition of the engine. In such a case, an ionic current I fails to be sensed, so the ECU erroneously determines misfiring in the engine. This is attributable to such causes as an unstable rotating state of the engine during an engine start-up period, a low output at the time of idling, incapability of supplying a sufficient amount of fuel to cylinders upon sudden acceleration, cut-off of the fuel supply at the time of sudden acceleration and so forth.

As described above, if the ionic current I fails to be sensed in spite of normal combustion occurring in the engine, the ECU determines misfiring, and a display means displays an indication of misfiring or abnormality, thus giving unnecessary warning or uneasiness to the driver.

In a further aspect, in the prior art misfiring sensing apparatus described above, the level of the ionic current I is sensed by a misfiring determining section in the ECU, so complicated signal processing and calculations have to be performed in the misfiring determining section. It is thus impossible to realize simplification and cost reduction of the misfiring determining section.

Furthermore, the above-described apparatus requires a plurality of transmission circuits used for sensing an ionic current I for each cylinder, and a crank angle sensor for identifying each cylinder. This results in a complicated circuit arrangement and increased noise superimposition.

SUMMARY OF THE INVENTION

Accordingly, the present invention is intended to obviate the above-mentioned problems of the above-described known apparatus.

An object of the invention is to provide a misfiring sensing apparatus which is simple in construction, inexpensive to manufacture, yet capable of preventing erroneous misfiring determination.

According to the invention, there is provided a misfiring sensing apparatus for an internal combustion engine, which comprises: ionic current sensing means for sensing an ionic current generated upon combustion of fuel in the engine and generating a corresponding output signal; ionic current determining means for determining whether an ionic current is present in each ignition cycle of each cylinder of the engine based on an output of the ionic current sensing means and generating a corresponding output signal; misfiring determining means for determining misfiring in the engine based on the output of the ionic current determining means; cylinder identifying means for identifying each cylinder; misfiring cylinder identifying means for identifying a misfiring cylinder based on the outputs of the misfiring determining means and the cylinder identifying means; and failure determining means for determining a failure in the ionic current sensing means if an ionic current has not been successively sensed for a predetermined number of ignitions corresponding to the number of cylinders.

In one form of the invention, the misfiring sensing apparatus further comprises: break sensing means for determining a break of wiring in the ionic current sensing means; and failure determining means for determining a failure in the ionic current sensing means based on the output of the break sensing means. In another form, the misfiring sensing means further comprises: operating range sensing means for sensing an operating range of the engine; and misfiring determination inhibiting means for inhibiting misfiring determination in a special operating range of the engine in which it is difficult to sense an ionic current.

In a further form, the misfiring sensing apparatus further comprises: misfiring indication prohibiting means for prohibiting an indication of misfiring if the ionic current sensing means has failed or if the engine is in the special operating range. The misfiring determination inhibiting means determines that the engine is in the special operating range if the engine is at the time of starting, idling or quick acceleration.

Preferably, the misfiring determining means calculates a misfiring factor indicative of the number of misfiring which has occurred within a predetermined period when the engine is out of the special operating range, and determines misfiring when the misfiring factor exceeds a predetermined value.

In a further form, the cylinder identifying means identifies each cylinder based on a signal related to the ignition of a specific cylinder of the engine.

In a further form, a signal forming means is connected to a plurality of spark plugs of cylinders of the engine for forming ionic current signals from the spark plugs into a single signal, and a single ionic current sensing means is connected through a secondary winding of an ignition coil to the signal forming means for sensing an ionic current generated upon combustion of fuel in each cylinder and generating a corresponding output signal for each cylinder. A crank angle sensor generates a cylinder identifying signal and a reference position signal indicative of predetermined reference crank positions of each cylinder. The cylinder identifying means identifies each cylinder based on the cylinder identifying signal from the crank angle sensor.

In a preferred embodiment, the signal forming means comprises: a central electrode connected to a secondary winding of an ignition coil and disposed for synchronized rotation with a crankshaft of the engine; a rotary electrode connected with the central electrode for integral rotation therewith; a plurality of stationary electrodes each connected to a corresponding spark plug and disposed around the central electrode in such a manner that a discharge is caused between the rotary electrode and the stationary electrodes each time the rotary electrode faces one of the stationary electrodes during rotation thereof; and a plurality of reverse current checking elements each connected between the center electrode and a corresponding stationary electrode for allowing a current to flow in a direction from the central electrode to the stationary electrodes but checking a current flow in a reverse direction.

In a further form, a plurality of ionic current sensing means are each connected to a spark plug of a corresponding cylinder through a secondary winding of an ignition coil for sensing an ionic current generated upon combustion of fuel in the corresponding cylinder and for generating a corresponding output signal for each cylinder. A signal forming means is connected to the plurality of ionic current sensing means for forming the output signals from the plurality of ionic current sensing means into a single signal. A crank angle sensor generates a reference position signal indicative of predetermined crank positions of each cylinder, and cylinder identifying means identifies each cylinder based on at least one output signal from the ionic current sensing means.

Preferably, the ionic current determining means is provided outside of the misfiring determining means, the output signal from the ionic current determining means being fetched into the misfiring determining means at every predetermined crank angle to perform misfiring determination.

The above and other objects, features and advantages of the invention will become more apparent from the following detailed description of preferred embodiments of the invention when read with reference to the accompanying drawings.

DETAILED DESCRIPTION OF THE PREFERRED EMBODIMENT

Figure 1:
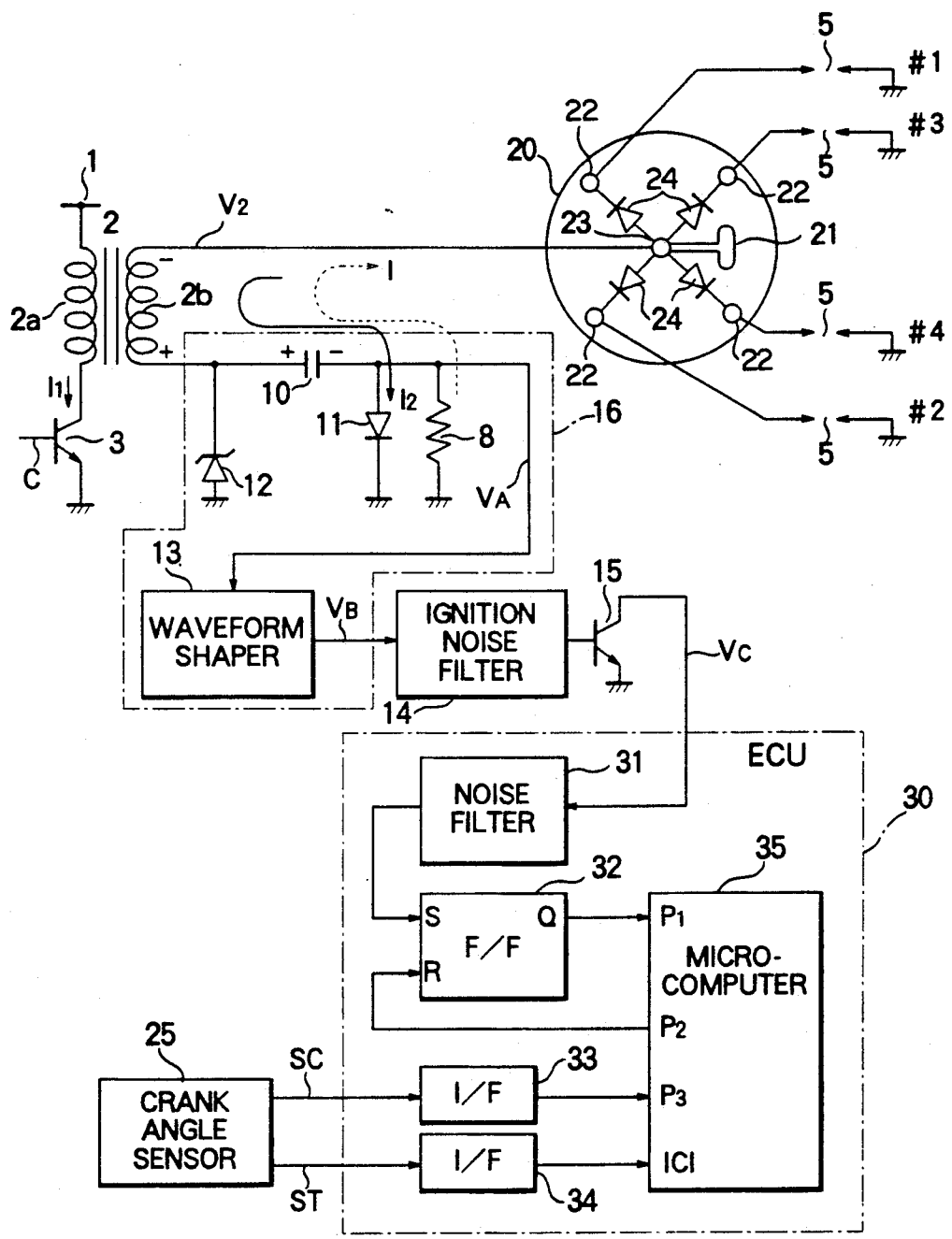
FIG. 1 is a schematic view showing the general arrangement of a misfiring sensing apparatus for an internal combustion engine according to the invention.

Preferred embodiments of the present invention will now be described in detail while referring to the accompanying drawings. Referring to the drawing and first to FIG. 1, a misfiring sensing apparatus for an internal combustion engine in accordance with a first embodiment of the invention is illustrated therein. In FIG. 1, an ignition coil 2 has a primary winding 2a and a secondary winding 2b. The primary winding 2a is connected at one end thereof to a power supply 1, which is in turn connected to an unillustrated power source such as a battery, and at the other end connected to a collector of a power transistor 3. The power transistor 3 has an emitter connected to ground and a base connected to receive a control signal C from an engine control unit (ECU) which will be described later in detail. The secondary winding 2b of the ignition coil 2 is connected at one end thereof through a distributor 20 to a plurality of spark plugs 5, which are provided one for each of cylinders (in the illustrated embodiment, four cylinders #1 through #4) of the engine.

A capacitor 10 is inserted in a secondary current path or an ignition current path including the secondary winding 2b and the spark plugs 5, through which an ignition current I2 flows. Specifically, the capacitor 10 is connected at one end thereof to the other end of the secondary winging 2b of the spark plug 2 and at the other end thereof to ground via a charging diode 11 with such an orientation as to allow the passage of an ignition current I2 in a direction from the capacitor 10 to ground, so that the ignition current I2 can flow through the ignition current path comprising the spark plugs 5, the distributor 20, the secondary winding 2b, the capacitor 10 and the charging diode 11.

An ionic current sensing resistor 8 is connected at its one end to a junction between the capacitor 10 and the diode 11 and at its other end to ground in parallel relation with respect to the diode 12, so that an ionic current I can flow through an ionic current path comprising the resistor 8, the capacitor 10, the secondary winding 2b, the distributor 20 and the spark plugs 5.

A Zener diode 12 is connected at its one end to a junction between the secondary winding 2b and the capacitor 10 and at its other end grounded for clipping the voltage charged into the capacitor 10 for ignition purpose.

The apparatus further includes a waveform shaper 13 connected to a junction between the capacitor 10 and the resistor 8 for shaping the waveform of an ionic current signal VA into a rectangular form, an ignition noise filter 14 connected to the waveform shaper 13 for removing ignition noise VN generated upon sparking of each spark plug 5 from an ionic current signal VB output from the waveform shaper 13, and a transistor 15 for amplifying the output signal from the noise filter 14 (i.e., the ionic current signal VB after removal of the ignition noise VN) and outputting an ignition-noise-free ionic current signal VC to the ECU. The elements 8 and 10 through 15 together constitute an ionic current sensing means for sensing an ionic current I generated between the electrodes of each spark plug 5.

The distributor 20 includes a rotary electrode 21 which rotates in synchronism with the rotation of a crankshaft of the engine, a plurality of stationary electrodes 22 which are disposed such that the rotary electrode 21 successively faces each of the stationary electrodes 22 during the rotation of the rotary electrode 21, and a central electrode 23 which is located at the center of rotation of the rotary electrode 21 and connected thereto for integral rotation. The central electrode 23 is operatively connected with the crankshaft for synchronized rotation therewith, and it is electrically connected to the secondary winding 2b of the ignition coil 2. A spark discharge is caused between the rotary and stationary electrodes 21 and 22 to thereby sequentially distribute a high voltage to the spark plugs 5 of the plurality of cylinders (in the illustrated embodiment, cylinders #1 to #4).

A reverse current checking element in the form of an ionic current sensing diode 24 is inserted between the central electrode 23 and each stationary electrode 22 in such an orientation that it allows a current to flow from the central electrode 23 to each stationary electrode 22 but checks a current flow in the reverse direction. Thus, each diode 24 checks a current from flowing in a direction from each stationary electrode 22 to the central electrode 23 upon generation of a high voltage between the rotary electrode 21 and each stationary electrodes 22, but allows an ionic current I to flow in a direction from the central electrode 23 to each stationary electrode 22. The distributor 20 and the ionic current sensing diodes 24 together constitute a signal forming means for forming a single signal from an ionic current signal VC which is generated for each cylinder by the ionic current sensing means 8 and 10–15. More specifically, a single signal is formed from a plurality of ionic current I by means of the central electrode 23 and applied to the single ionic current sensing means.

A crank angle sensor 25 generates a cylinder identifying signal SC used for cylinder identification and a reference position signal ST indicative of predetermined reference crankshaft angles or positions, these signals SC and ST being fed to the ECU 30.

The ECU 30 controls the ignition of each cylinder based on the ionic current signal VC from the transistor 15, and the cylinder identifying signal SC and the reference position signal ST from the crank angle sensor 25.

The ECU 30 is constructed as follows. A noise filter 31 removes noise in the ionic current signal VC from the transistor 15. A flip-flop circuit 32 has a set input terminal to which the ionic current signal VC is input from the noise filter 31, a reset terminal R and an output terminal Q. A pair of first and second interfaces 33 and 34 latch the cylinder identifying signal ST and the reference position signal ST, respectively. A microcomputer 35 has a first output port P1 connected to the output terminal Q of the flip-flop circuit 32, a reset port P2 for supplying a reset signal in the form of an ignition pulse to the reset terminal of the flip-flop circuit 32, a second input port P3 to which the cylinder identifying signal SC is input from the crank angle sensor 25 via the first interface 33, and a third or interrupt input port ICI to which the reference position signal ST is input from the crank angle sensor 25 via the second interfaces 34.

Although not shown, an operating range signal from an unillustrated operating range sensing means is also input to the ECU 30, and a display means is connected to the ECU 30 for displaying a misfiring or like abnormality.

The flip-flop circuit 32 constitutes an ionic current determining means for determining the presence or absence of an ionic current I for each ignition cycle.

The microcomputer 35 includes a cylinder identifying means, a misfiring determining means, a misfiring indicating means, a failure sensing means, and a misfiring indication prohibiting means. The cylinder identifying means identifies each cylinder based on the cylinder identifying signal SC. The misfiring determining means reads out an output signal of the ionic current determining means at a predetermined timing in each ignition cycle [for instance, at a crank angle of 75° in advance of top dead center (TDC) (referred to as B75°)], and determines misfiring in the engine if there is no ionic current I present. The misfiring indicating means indicates misfiring in the engine upon determination of misfiring. The failure sensing means senses and determines a failure in the ionic current sensing means. The failure sensing means performs failure determination based on the operating range signal only in a predetermined operating range of the engine in which it is possible to sense an ionic current. The prohibiting means prohibits an indication of misfiring when a failure in the ionic current sensing means is sensed.

Figure 2:
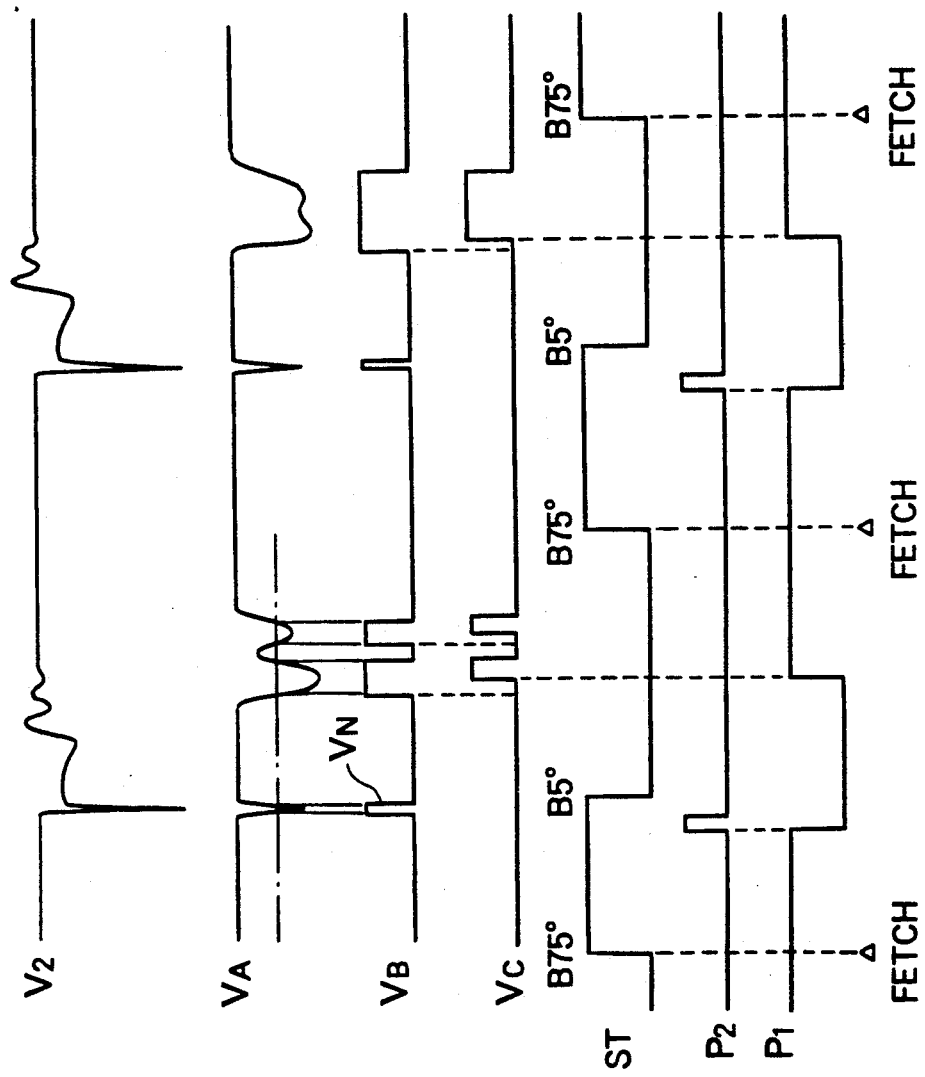
FIG. 2 is a waveform diagram showing waveforms of various signals used in the misfiring sensing apparatus of FIG. 1.

Now, the misfiring determining operation of the first embodiment of the invention shown in FIG. 1 will be described with reference to the waveform diagram of FIG. 2. As noted above, when current supplied from the power supply 1 to the primary winding 2a of the ignition coil 2 is cut off, a high voltage V2 with a negative polarity as illustrated in FIG. 2 is generated across the secondary winding 2b, thereby causing an ignition current I2 to flow through the spark plugs 5, the stationary electrodes 22, the rotary electrode 21, the secondary winding 2b, the capacitor 10 and the charging diode 11, as shown by a solid line.

With the ignition current I2, the capacitor 10 is charged to build up a voltage of the illustrated polarity. The polarity of the high voltage can be set as desired, for example, by properly selecting the direction of winding of the secondary winding 2b or the like.

At this time, only the spark plug 5 of the cylinder selected by the rotary electrode 21 of the distributor 20 (i.e., the spark plug 5 corresponding to the stationary electrode 22 which faces the rotary electrode 21) is discharged to spark, thus generating an ignition current I2. Immediately after the sparking, an ionic current I is generated between the electrodes of the spark plug 5 through combustion of an air/fuel mixture in the selected cylinder, the ionic current I thus generated flowing through the secondary winding 2b and the resistor 8 in the ionic current sensing means.

Specifically, when the mixture in each cylinder is fired and normally combusted by a spark caused between the electrodes of each spark plug 5 in the combustion or ignition cycle of each cylinder, cations generated in the combustion chamber of each cylinder flow, as an ionic current I, through a path comprising the resistor 8, the capacitor 10, the secondary winding 2b, the central electrode 23, the ionic current sensing diodes 24, the stationary electrodes 22 and the spark plugs 5, thus discharging the capacitor 10.

The ionic current I is successively sensed for the individual cylinders, for instance, cylinders #1 to #4 of the four-cylinder engine.

An ionic current signal VA in the form of a voltage generated across the resistor 8 by the ionic current I is waveform shaped by the waveform shaper 13 into a rectangular wave VB. Further, ignition noise VN generated upon sparking of each spark plug 5 is removed by the ignition noise filter 14 including a delay filter, and thus the ionic current signal VC free from the ignition noise VN is finally output from the transistor 15. Thus, the ionic current signal VC is input as a digital signal to the ECU 30.

The noise filter 31 in the ECU 30 removes noise superimposed on the ionic current signal VC during transmission thereof, and the resultant filtered signal is input to the set terminal S of the flip-flop circuit 32. Thus, the Q output of the flip-flop circuit 32 becomes high ("H"). This output is input to the first input port P1 of the microcomputer 35. At this time, although the ionic current signal VC may be sensed as a plurality of pulses in one sensing, as shown in FIG. 2, the Q output of the flip-flop circuit 32 is not changed but remains at a high level ("H").

Meanwhile, the microcomputer 35 performs ignition control at an optimum timing for each cylinder according to the cylinder identifying signal SC and the reference position signal ST from the crank angle sensor 25. An ignition pulse that is generated for optimum ignition by the microcomputer 35 based on the signals SC and SC is output from the reset port P2 to the reset terminal R of the flip-flop circuit 32.

Further, an ionic current determining signal, which is output from the Q terminal of the flip-flop circuit 32 to the port P1 and stored in the microcomputer 35, is fetched at a predetermined timing of B75° for each ignition cycle based on the reference position signal ST.

Each combustion stroke takes place in the neighborhood of a predetermined crank angle of 5° in advance of top dead center (referred to as B5°) for each cylinder, and an ionic current I is generated immediately after ignition of each cylinder. Thus, the microcomputer 35 can reliably determine whether or not the ionic current I is present, by resetting the flip-flop circuit 32 by every ignition pulse P2 and fetching the ionic current determining signal P1 at the timing of the predetermined reference position of B75°.

If it is found that the ionic current determining signal is low ("L") at the reference position of B75°, the microcomputer 35 determines the absence of an ionic current I and hence determines misfiring in the related cylinder.

That is, the microcomputer 35 identifies the cylinder under control according to the cylinder identifying signal SC and determines misfiring based on the ionic current determining signal P1. If the microcomputer 35 determines misfiring, it sets a misfiring flag to "1" for misfiring control and actuates the indicating means to make an indication of misfiring, thereby informing the driver of the misfiring.

Figure 3:
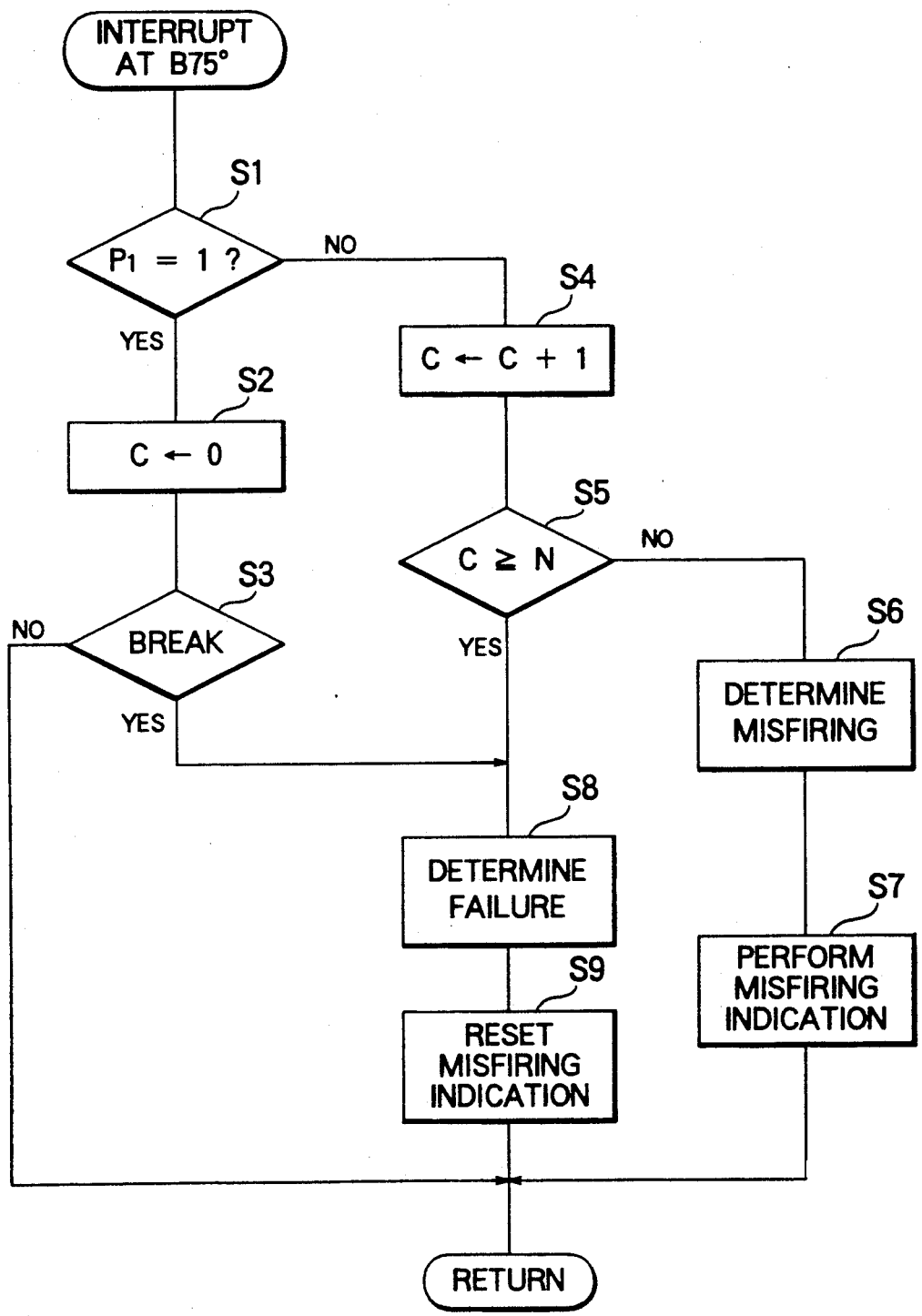
FIG. 3 is a flow chart showing an example of a misfiring determining program executed by the apparatus of FIG. 1.

Now, the operation of the above-described apparatus will be described with reference to the flow chart of FIG. 3 which shows one example of a control process or program in the form of a B75° interrupt routine executed by the microcomputer 35 of FIG. 1 for fetching an ionic current determining signal P1.

In this example, first in Step S1, it is determined whether the ionic current determining signal P1 is "1" (i.e., indicative of the presence of the ionic current signal VC). If the signal P1 is "1", a counter variable C is cleared to "0" in Step S2. Subsequently, in Step S3, a check is done as to whether there is a break in any element in the ionic current sensing means. If no break is sensed, a return is performed. If, however, a break is sensed, the process proceeds to a failure determination step S8, which will be described later. The determination of breaks is effected by continuously sensing the ionic current signal VC and confirming that the signal P1 is continuously "1" ("H" level) for a predetermined period of time according to a timer or an integrator.

If it is determined in Step S1 that the signal P1 is not equal to "1" but "0" (i.e., indicative of the absence of an ionic current signal VC), then in Step S4, the counter variable C is incremented, and thereafter in Step S5, a check is done as to whether the counter variable or counted number C is equal to a predetermined number N (in this instance, N is 4 for four cylinders) which is equal to the number of cylinders.

If C is less than N, the microcomputer 35 determines misfiring (Step S6), and sets the misfiring flag to "1" while making an indication of misfiring (Step S7), as noted above. If, however, it is found in Step S5 that C is not less than N, then in Step S8, the microcomputer 35 determines a failure in the ionic current sensing means, as in the determination of breaks in Step S3. At this time, the microcomputer 35 resets the misfiring flat to "0" and also prohibits, i.e., resets, the misfiring indication (Step S9). Also at this time, an indication of the failure in the ionic current sensing means is done, if necessary.

Usually, there is little or almost no possibility of occurrence of misfiring in all the cylinders during engine operation. Therefore, in the case of sensing the absence of the ionic current determining signal P1 for four successive ignitions (i.e., for the four cylinders), it can be determined that there is no misfiring and that there is a failure in the ionic current sensing means.

Figure 4:
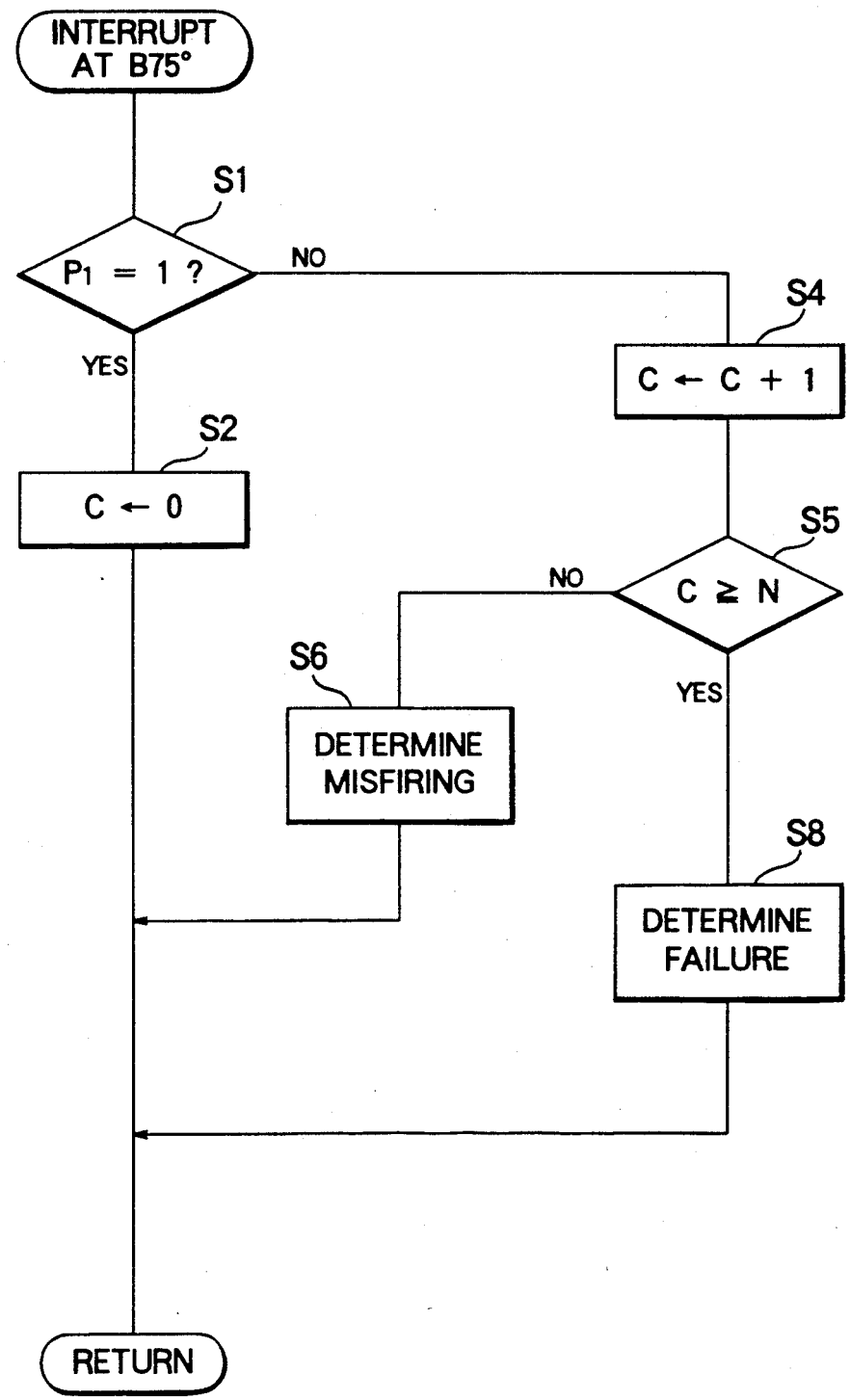
FIG. 4 is a flow chart showing another example of a misfiring determining program executed by the apparatus of FIG. 1.

FIG. 4 illustrates another example of a control process or program executed by the microcomputer 30 of FIG. 1. This example is simplified in comparison with the above-mentioned first example of FIG. 3, thus permitting a further reduction in size and cost of the apparatus. That is, this example comprises Steps S1, S2, S4–S6 and S8, all of which are the same as those in the first example of FIG. 3, while simply omitting Steps S3, S7 and S9 of the FIG. 3 example. Thus, in the example of FIG. 4, if it is determined in Step S5 that misfiring has taken place in all the cylinders of the engine, then in Step S8, the microcomputer 35 determines a failure in the ionic current sensing means. After Steps S2, S6 or S8, a return is carried out.

In the above-mentioned first and second examples, the determination of misfiring in all the cylinders of the engine leads to the determination of a failure in the ionic current sensing means. As referred to before, in special operating ranges of the engine such as an engine start-up operation, idling or quick acceleration in which engine operation is unstable or not in a steady-state operation, however, it is difficult to sense an ionic current signal VC even if normal combustion takes place in each cylinder.

Thus, according to a further aspect of the invention, misfiring determination is prohibited in special operating ranges of the engine, whereas it is permitted only in a predetermined operating range in which an ionic current signal VC can be sensed without fail.

Figure 5:
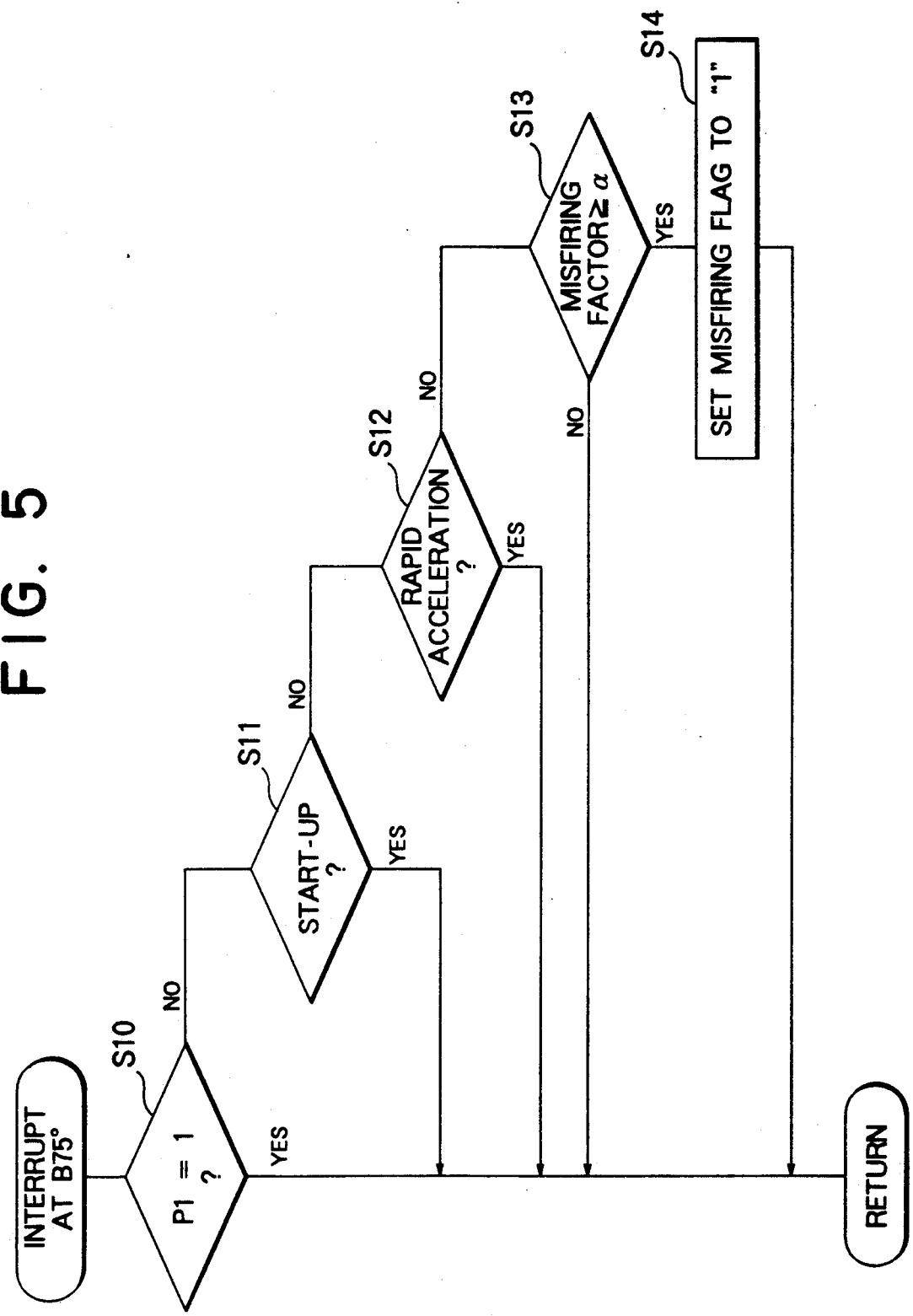
FIG. 5 is a flow chart showing a further example of a misfiring determining program executed by the apparatus of FIG. 1.

FIG. 5 illustrates a further example of a control process or program in the form of a B75° interrupt routine executed at a crank angle of B75° for each cylinder by the microcomputer 35 of FIG. 1 for performing such control, i.e., prohibiting misfiring determination in special operating ranges of the engine.

In this case, misfiring in a cylinder is determined when a misfiring factor in a predetermined number of ignition cycles exceeds a predetermined value. The misfiring factor is defined as a ratio of the number of misfirings to the total number of ignition cycles.

In this example, first in Step S10, a check is done as to whether the ionic current determining signal P1 is equal to "1" (i.e., indicative of the presence of an ionic current signal VC). If the signal P1 is equal to "1", it is determined that normal combustion has taken place, so a return is carried out. If, however, it is determined in Step S10 that the signal P1 is not equal to "1" but "0" (i.e., indicative of the absence of an ionic current signal VC), then in Step S11, a check is done as to whether the operating range of the engine is in an engine start-up period.

If the engine is in a start-up period, a return is performed while skipping the following misfiring determination Steps S13 and S14 which will be described later. If the engine is not in a start-up period, then in Step S12, a check is done as to whether the engine is in a sudden acceleration.

If the engine is in a sudden acceleration, a return is performed while skipping the misfiring determination steps. If, however, the engine is not in a sudden acceleration, then in Step S13, a check is done as to whether the misfiring factor in n cycles exceeds a predetermined value $\alpha$.

In this manner, the misfiring determination step S13 is executed only in the normal or steady state operating range of the engine and is prohibited in special or non-steady state operating ranges including an engine start-up period (Step S11), a sudden acceleration (Step S12) and the like.

If it is found in Step S13 that the misfiring factor is less than $\alpha$, the control process returns to Step S10 without making misfiring determination. If the misfiring factor is equal to or greater than $\alpha$, then in Step S14, it is determined that there is misfiring in the engine, and the misfiring flag is set to "1". When the misfiring flag is set to "1", the microcomputer 35 takes an appropriate measure such as cutting off the fuel supply to the misfiring cylinder.

In this example, since the misfiring determination step 13 is skipped or prohibited in special operating ranges of the engine such as the time of cutting fuel supply, in which misfiring determination is unnecessary, it is possible to reliably prevent an erroneous determination of misfiring. In the above first to third examples illustrated in FIGS. 3, 4 and 5, respectively, the path of transmission of the ionic current signal VC from the ionic current sensing means to the ECU 30 is constituted by a single signal line, it is possible to simplify the entire construction of the apparatus, realize cost reduction and improve the noise-resistant property.

Further, since the ionic current signal VC transmitted to the ECU 30 is digitalized by the waveform shaper 13, noise is not readily superimposed on the thus digitized ionic current signal VC, thus improving the noise-resistant property in a reliable manner.

Further, since the microcomputer 35 only determines the level of the ionic current determining signal P1, the construction of the misfiring determining means incorporated in the microcomputer 35 can be simplified.

Figure 8:
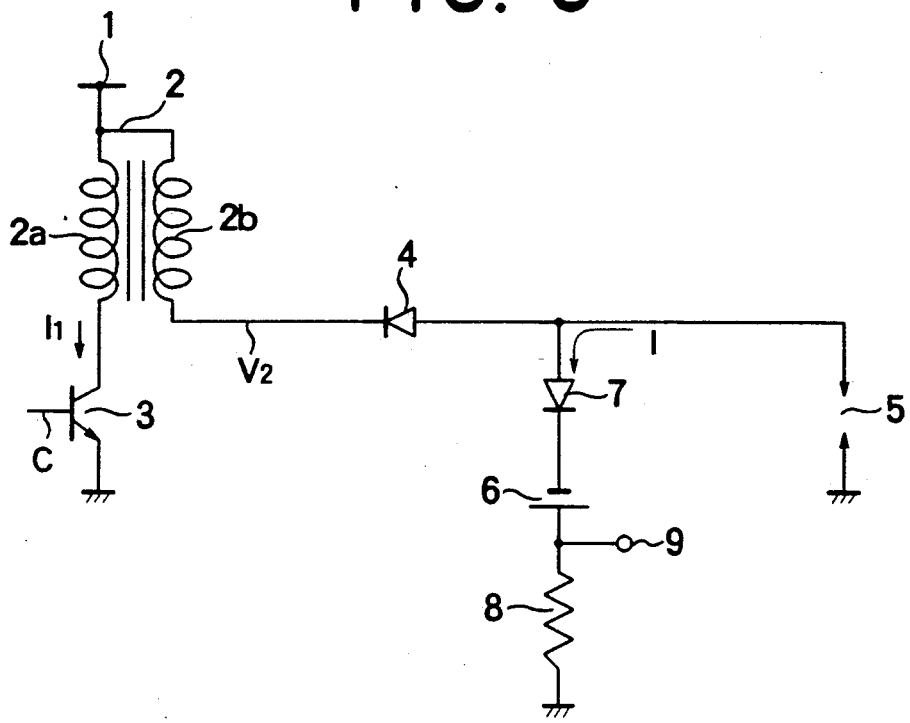
FIG. 8 is a circuit diagram showing a known misfiring sensing apparatus for an internal combustion engine.
Figure 9:
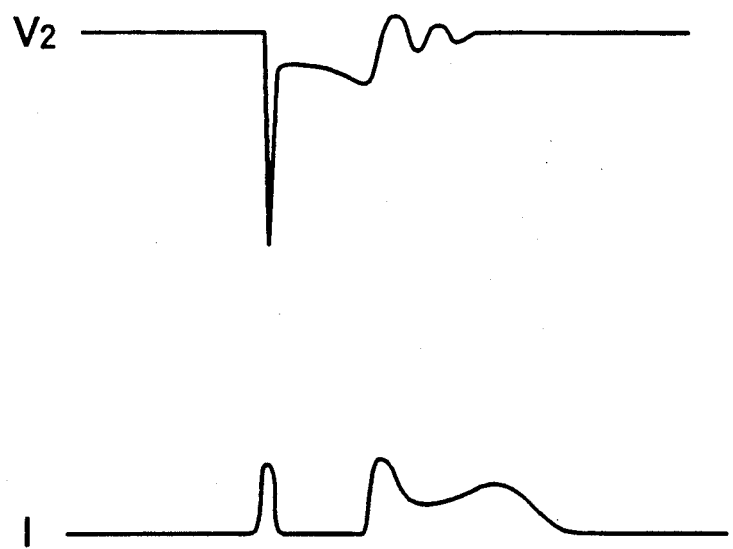
FIG. 9 is a waveform diagram showing waveforms of signals in the apparatus of FIG. 8.

Further, since the capacitor 10 is used as a power supply by charging it with an ignition current I2 prior to the sensing of an ionic current I and then discharging it with an ionic current I, it is possible to dispense with the power supply 6 in the previously described circuit of FIG. 8. Further, by distributing a high voltage to the spark plugs 5 of the individual cylinders via the distributor 20 and passing the ionic current I for each cylinder through the ion current sensing diode 24, it is possible to sense an ionic current I for each cylinder with a single circuit, thus permitting a further reduction in size and cost of the apparatus.

In the above-described embodiment of FIG. 1, the signal mixing or forming means is constituted by the distributor 20 including the rotary, stationary and central electrodes 21 to 23 and the ionic current sensing diodes 24. It is also possible to adopt another signal forming circuit as shown in FIG. 6.

Figure 6:
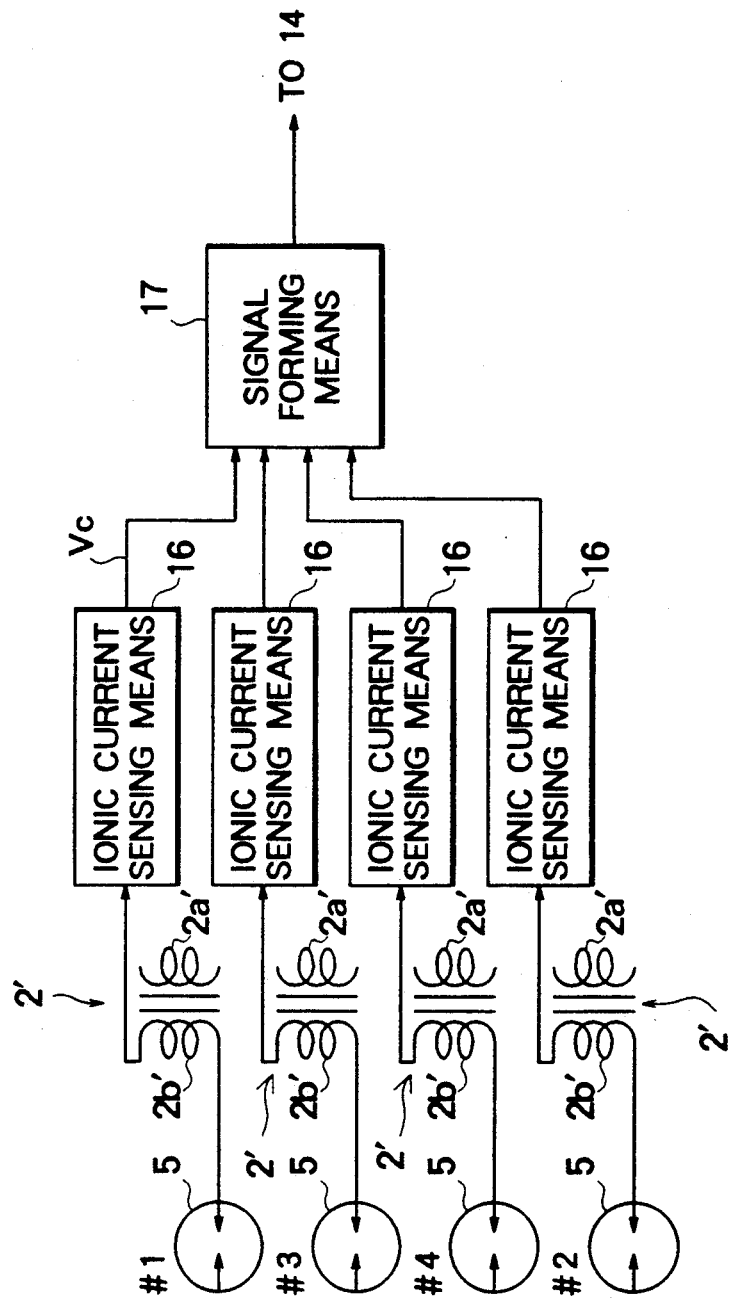
FIG. 6 is a schematic circuit diagram showing an example of a signal mixing means according to the present invention.

Referring to FIG. 6, a plurality of ignition coils 2' are provided one for each cylinder, and each of the ignition coils 2' has a primary winding 2a' which, though not illustrated in detail, is arranged substantially in the same manner as the primary winding 2a of the ignition coil 2 of FIG. 1, and a secondary winding 2b' directly connected at its one end to a corresponding spark plug 5. A plurality of ionic current sensing means 16 are also provided one for each cylinder, and each of the ionic current sensing means 16 is connected to the other end of the secondary winding 2b' of a corresponding ignition coil 2'. Each of the ionic current sensing means 16 is constructed in the same manner as that of FIG. 1. That is, it comprises an ionic current sensing resistor, a capacitor, a charging diode, a Zener diode, a waveform shaper, an ignition noise filter and a transistor, which are the same as elements 8 through 15 of FIG. 1 and arranged in the same manner. A signal mixing or forming circuit 17 is connected to receive the ionic current signals VC from the plurality of ionic current sensing means 16 for forming or mixing the ion current signals VC into a single signal, which is then output to the ECU 30 of FIG. 1.

Figure 7:
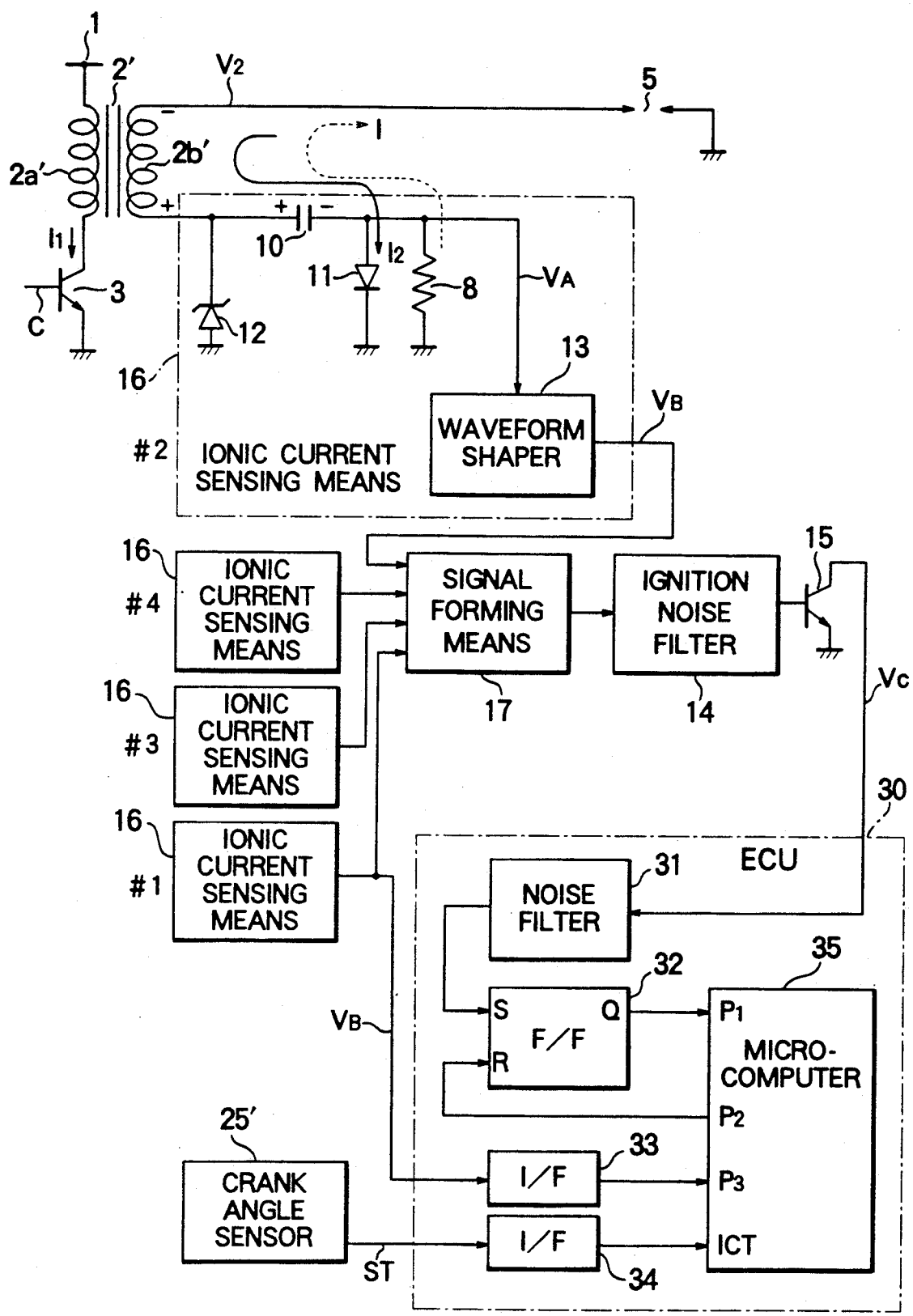
FIG. 7 is a schematic view showing another embodiment of the misfiring sensing apparatus for an internal combustion engine provided with cylinder identifying means.

FIG. 7 shows a further embodiment of the invention, which can employ a simple crank angle sensor 25' for generating a reference position signal ST, thus further contributing to size and cost reduction. This embodiment is substantially similar to the first embodiment of FIG. 1 in combination with the embodiment of FIG. 6 except for the following. The distributor 20 of FIG. 1 is omitted, and instead a plurality of ignition coils 2' (only one is illustrated in FIG. 7) are provided one for each cylinder, each ignition coil 2' having a secondary winding 2b' connected at one end thereof to a spark plug 5 of a corresponding cylinder and at the other end thereof to a corresponding ignition current sensing means 16, as in the embodiment of FIG. 6. Each of the plurality of ionic current sensing means 16 is the same as that of FIG. 6 and generates an ionic current signal indicative of an ionic current generated between electrodes of a corresponding spark plug 5 upon combustion of fuel in a corresponding cylinder. The output signals from the ionic current sensing means 16 are input to a signal forming or mixing means 17 where they are mixed or formed into a single ionic current signal VC, as in the embodiment of FIG. 6, which is then fed to an ECU 30 through an ignition noise filter 14 and a transistor 15, as in the embodiment of FIG. 1. In this embodiment, an ionic current signal VB output from one of the ionic current sensing means 16 corresponding to a specific cylinder (e.g., cylinder #1 in the illustrated example) is also input to the microcomputer 30 via an interface 33. The crank angle sensor 25' generates a reference position signal ST indicative of predetermined crank angles or positions, which is fed to the microcomputer 35 via an interface 34. The ECU controls the ignition of each cylinder and performs misfiring determination and so forth based on the ionic current signal VC from the transistor 15, the ionic current signal VB for a specific cylinder (for instance, cylinder #1) from one of the ionic current sensing means 16, and the reference position signal ST from the crank angle sensor 25'. In this case, the ionic current signal VB input to the ECU 35 is used for identifying the specific cylinder which has been just ignited. Thus in this embodiment, cylinder identification is effected based on the ionic current signal VB indicative of the ignition of a specific cylinder from one of the ionic current sensing means 16 in the ionic current sensing means, the crank angle sensor 25 has to generate only the reference position signal ST, and hence, the construction and arrangement of the crank angle sensor 25' can be substantially simplified.

While in the above embodiment, the ionic current signals VB from the plurality of ionic current sensing means 16 are converted into a single signal VC by the single-signal forming circuit 17, it is also possible to directly input the individual signals VB to the ECU 35, and in this case, it is of course possible to perform cylinder identification based on the individual ionic current signals VB.

Further, instead of using the ionic current signal VB, cylinder identification can be carried out by using any signal related to the ignition of a cylinder such as a signal substantially based on a ionic current I or on ignition noise VN.

What is claimed is:

1. A misfiring sensing apparatus for an internal combustion engine comprising:

ionic current sensing means for sensing an ionic current generated upon combustion of fuel in said engine and generating a corresponding output signal;

ionic current determining means for determining whether an ionic current is present in each ignition cycle of each cylinder of the engine based on an output of said ionic current sensing means and generating a corresponding output signal;

misfiring determining means for determining misfiring in said engine based on the output of said ionic current determining means;

cylinder identifying means for identifying each cylinder; misfiring cylinder identifying means for identifying a misfiring cylinder based on the outputs of said misfiring determining means and said cylinder identifying means; and failure determining means for determining a failure in said ionic current sensing means if an ionic current has not been successively sensed for a predetermined number of ignitions corresponding to the number of cylinders.

2. A misfiring sensing apparatus for an internal combustion engine comprising:

ionic current sensing means for sensing an ionic current generated upon combustion of fuel in said engine and generating a corresponding output signal;

ionic current determining means for determining whether an ionic current is present in each ignition cycle of each cylinder based on the output of said ionic current sensing means and generating a corresponding output signal;

misfiring determining means for determining misfiring in said engine based on the output of said ionic current determining means;

break sensing means for determining a break of wiring in said ionic current sensing means; and failure determining means for determining a failure in said ionic current sensing means based on the output of said break sensing means.

3. A misfiring sensing apparatus for an internal combustion engine comprising:

ionic current sensing means for sensing an ionic current generated upon combustion of fuel in said engine and generating a corresponding output signal;

operating range sensing means for sensing an operating range of said engine;

ionic current determining means for determining whether an ionic current is present in each ignition cycle of each cylinder of said engine based on the output of said ionic current sensing means and generating a corresponding output signal;

misfiring determining means for determining misfiring in said engine based on the output of said ionic current determining means;

cylinder identifying means for identifying each cylinder;

misfiring cylinder identifying means for identifying a misfiring cylinder based on the outputs of said misfiring determining means and said cylinder identifying means; and misfiring determination inhibiting means for inhibiting misfiring determination in a special operating range of said engine in which it is difficult to sense an ionic current.

4. A misfiring sensing apparatus for an internal combustion engine according to one of claims 1 to 3, further comprising misfiring indication prohibiting means for prohibiting an indication of misfiring if said ionic current sensing means has failed or if said engine is in the special operating range.

5. A misfiring sensing apparatus for an internal combustion engine according to claim 3, wherein said misfiring determination inhibiting means determines that said engine is in the special operating range if said engine is at the time of starting, idling or quick acceleration.

6. A misfiring sensing apparatus for an internal combustion engine according to claim 3, wherein said misfiring determining means calculates a misfiring factor indicative of the number of misfiring which has occurred within a predetermined period when said engine is out of the special operating range, and determines misfiring when the misfiring factor exceeds a predetermined value.

7. A misfiring sensing apparatus for an internal combustion engine comprising:

ionic current sensing means for sensing an ionic current generated upon combustion of fuel in said engine and generating a corresponding output signal;

ionic current determining means for determining whether an ionic current is present in each ignition cycle of each cylinder of said engine based on the output signal of said ionic current sensing means and generating a corresponding output signal; misfiring determining means for determining misfiring in said engine based on the output signal of said ion current determining means;

cylinder identifying means for identifying each cylinder based on a signal related to the ignition of a specific cylinder of said engine; and misfiring cylinder identifying means for identifying a misfiring cylinder based on the outputs of said misfiring determining means and said cylinder identifying means.

8. A misfiring sensing apparatus for an internal combustion engine comprising:

signal forming means connected to a plurality of spark plugs of cylinders of said engine for forming ionic current signals from said spark plugs into a single signal;

single ionic current sensing means connected through a secondary winding of an ignition coil to said signal forming means for sensing an ionic current generated upon combustion of fuel in each cylinder and generating a corresponding output signal for each cylinder;

ionic current determining means for determining whether an ionic current is present in each ignition cycle of each cylinder of said engine based on the output signal of said ionic current sensing means and generating a corresponding output signal; misfiring determining means for determining misfiring in each cylinder based on the output signal of said ionic current determining means;

a crank angle sensor for generating a cylinder identifying signal and a reference position signal indicative of predetermined reference crank positions of each cylinder;

cylinder identifying means for identifying each cylinder based on the cylinder identifying signal from said crank angle sensor; and misfiring cylinder identifying means for identifying a misfiring cylinder based on the outputs of said misfiring determining means and said cylinder identifying means.

9. A misfiring sensing apparatus for an internal combustion engine according to claim 8, wherein said signal forming means comprises:

a central electrode connected to a secondary winding of an ignition coil and disposed for synchronized rotation with a crankshaft of said engine;

a rotary electrode connected with said central electrode for integral rotation therewith;

a plurality of stationary electrodes each connected to a corresponding spark plug and disposed around said central electrode in such a manner that a discharge is caused between said rotary electrode and said stationary electrodes each time said rotary electrode faces one of said stationary electrodes during rotation thereof; and a plurality of reverse current checking elements each connected between said center electrode and a corresponding stationary electrode for allowing a current to flow in a direction from said central electrode to said stationary electrodes but checking a current flow in a reverse direction.

10. A misfiring sensing apparatus for an internal combustion engine comprising:
- a plurality of ionic current sensing means each connected to a spark plug of a corresponding cylinder of said engine through a secondary winding of an ignition coil for sensing an ionic current generated upon combustion of fuel in the corresponding cylinder and generating a corresponding output signal for each cylinder;
- signal forming means connected to said plurality of ionic current sensing means for forming the output signals from said plurality of ionic current sensing means into a single signal; ionic current determining means for determining whether an ionic current is present in each ignition cycle of each cylinder based on the single output signal from said signal forming means and generating a corresponding output signal;
- misfiring determining means for determining misfiring in each cylinder based on the output signal of said ionic current determining means;
- a crank angle sensor for generating a reference position signal indicative of predetermined crank positions of each cylinder;
- cylinder identifying means for identifying each cylinder based on at least one output signal from said ionic current sensing means; and
- misfiring cylinder identifying means for identifying a misfiring cylinder based on the outputs of said misfiring determining means and said cylinder identifying means.

11. A misfiring sensing apparatus for an internal combustion engine comprising:
- ionic current sensing means for sensing an ionic current generated upon combustion of fuel in said engine and generating a corresponding output signal;
- ionic current determining means for determining whether an ion current is present in each ignition cycle of each cylinder based on the output signal of said ionic current sensing means and generating a corresponding output signal;
- misfiring determining means for determining misfiring in said engine based on the output of said ionic current sensing means;
- cylinder identifying means for identifying each cylinder; and
- misfiring cylinder identifying means for identifying a misfiring cylinder based on the outputs of said misfiring determining means and said cylinder identifying means;
- wherein said ionic current determining means is provided outside of said misfiring determining means, the output signal from said ionic current determining means being fetched into said misfiring determining means at every predetermined crank angle to perform misfiring determination.

* * * * *